United States Patent [19]

Nelson

[11] 4,145,176
[45] Mar. 20, 1979

[54] CABLE MOLDING APPARATUS FOR ACCOMPLISHING SAME

[75] Inventor: Arthur L. Nelson, La Jolla, Calif.

[73] Assignee: Townsend & Townsend, San Francisco, Calif.

[21] Appl. No.: 863,257

[22] Filed: Dec. 22, 1977

Related U.S. Application Data

[60] Division of Ser. No. 541,298, Jan. 15, 1975, Pat. No. 4,091,062, which is a continuation-in-part of Ser. No. 388,263, Aug. 14, 1973, abandoned, which is a continuation-in-part of Ser. No. 274,823, Jul. 24, 1972, abandoned, which is a continuation-in-part of Ser. No. 119,150, Feb. 26, 1971, abandoned.

[51] Int. Cl.² .............................................. B29C 6/00
[52] U.S. Cl. ............................... 425/405 R; 425/116; 425/129 R; 425/547; 249/53 R; 249/90; 249/78; 249/79; 249/163
[58] Field of Search ................. 249/53, 90, 78, 163, 249/79, 205, 131; 425/405 R, 116, 547, 129 R, 407, 388

[56] References Cited

U.S. PATENT DOCUMENTS

| | | | |
|---|---|---|---|
| 1,116,394 | 11/1914 | Doehring | 249/90 |
| 1,303,889 | 5/1919 | Gruenfeld | 249/204 X |
| 1,389,785 | 9/1921 | Riblet | 249/90 |
| 1,751,811 | 3/1930 | Guilbault | 249/90 |
| 2,357,706 | 9/1944 | Toepperwein | 425/407 X |
| 2,781,564 | 2/1957 | Meyers | 249/137 |
| 2,791,019 | 5/1957 | Du Laney | 249/90 X |
| 2,841,823 | 7/1958 | Van Hartesveldt | 425/388 X |
| 2,908,744 | 10/1959 | Ballineier | 249/90 X |
| 2,960,736 | 11/1960 | Poudevigne | 249/78 |
| 3,135,020 | 6/1964 | Hall et al. | 425/129 R |
| 3,145,421 | 8/1964 | Colbert | 249/53 X |
| 3,173,175 | 3/1965 | Lemelson | 249/78 X |
| 3,259,680 | 7/1966 | Schelke | 425/129 R X |
| 3,568,246 | 3/1971 | David | 425/129 R X |
| 3,659,077 | 4/1972 | Olson | 249/78 X |
| 4,061,872 | 12/1977 | De Monsy et al. | 249/90 X |

Primary Examiner—J. Howard Flint, Jr.
Attorney, Agent, or Firm—Olson, Trexler, Wolters, Bushnell & Fosse, Ltd.

[57] ABSTRACT

A method and apparatus for forming cured polyethylene insulation about high voltage cables by applying uncured polyethylene around a core of the cable. The polyethylene is heated, cured and then cooled to room temperature in a pressurized nitrogen gas atmosphere. In one form the molding apparatus comprises first and second mold forms which define a cavity and which include means for heating the mold halves to the polyethylene curing temperature. Means is also provided to introduce the pressurized nitrogen into the cavity and for subjecting cable portions that extend beyond the mold to pressurized nitrogen until such cable portions are sufficiently cooled to prevent their deformation under pressure, to prevent the oxidation of polyethylene and/or to prevent the formation of voids or enclosures. In another embodiment, the apparatus includes cooling openings for receiving a coolant preselectedly along the molding apparatus, a number of spaced-apart temperature gauges for indicating temperature at various locations along the apparatus, a pressure gauge for indicating pressure in the mold cavity, a heat source and a nitrogen source. At each end of the apparatus are recesses in which soft resilient strips are located. During the molding process, the ends of the molding apparatus are kept at a reduced temperature and the pressure in the mold cavity is varied, the nitrogen being used to pressurize the mold cavity during curing. This method insures a quality repair or splice without detracting from the quality of the cable.

18 Claims, 8 Drawing Figures

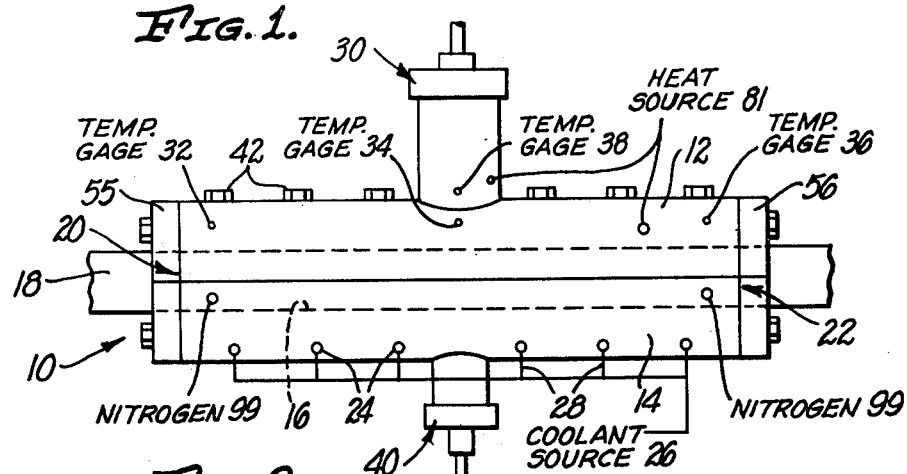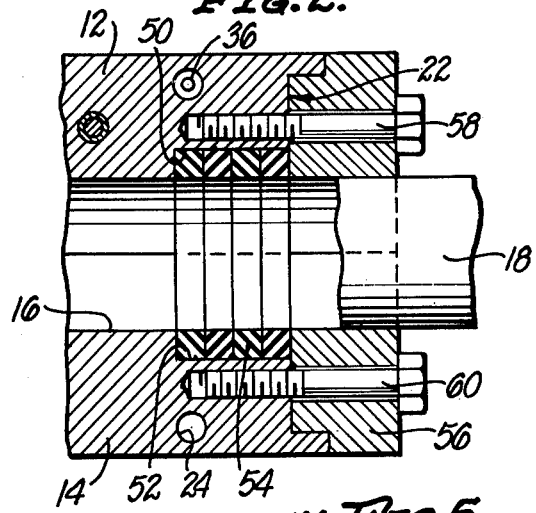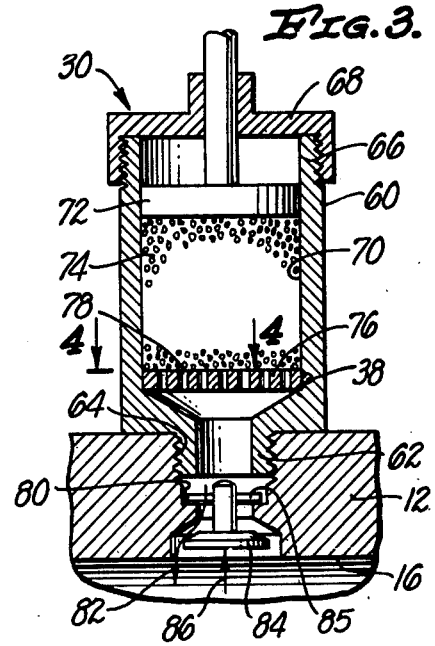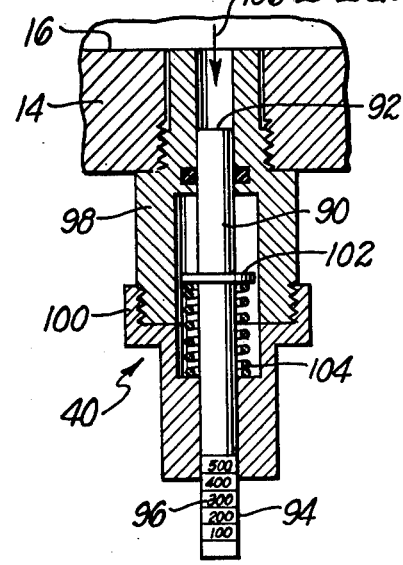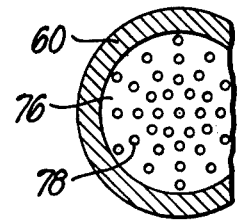

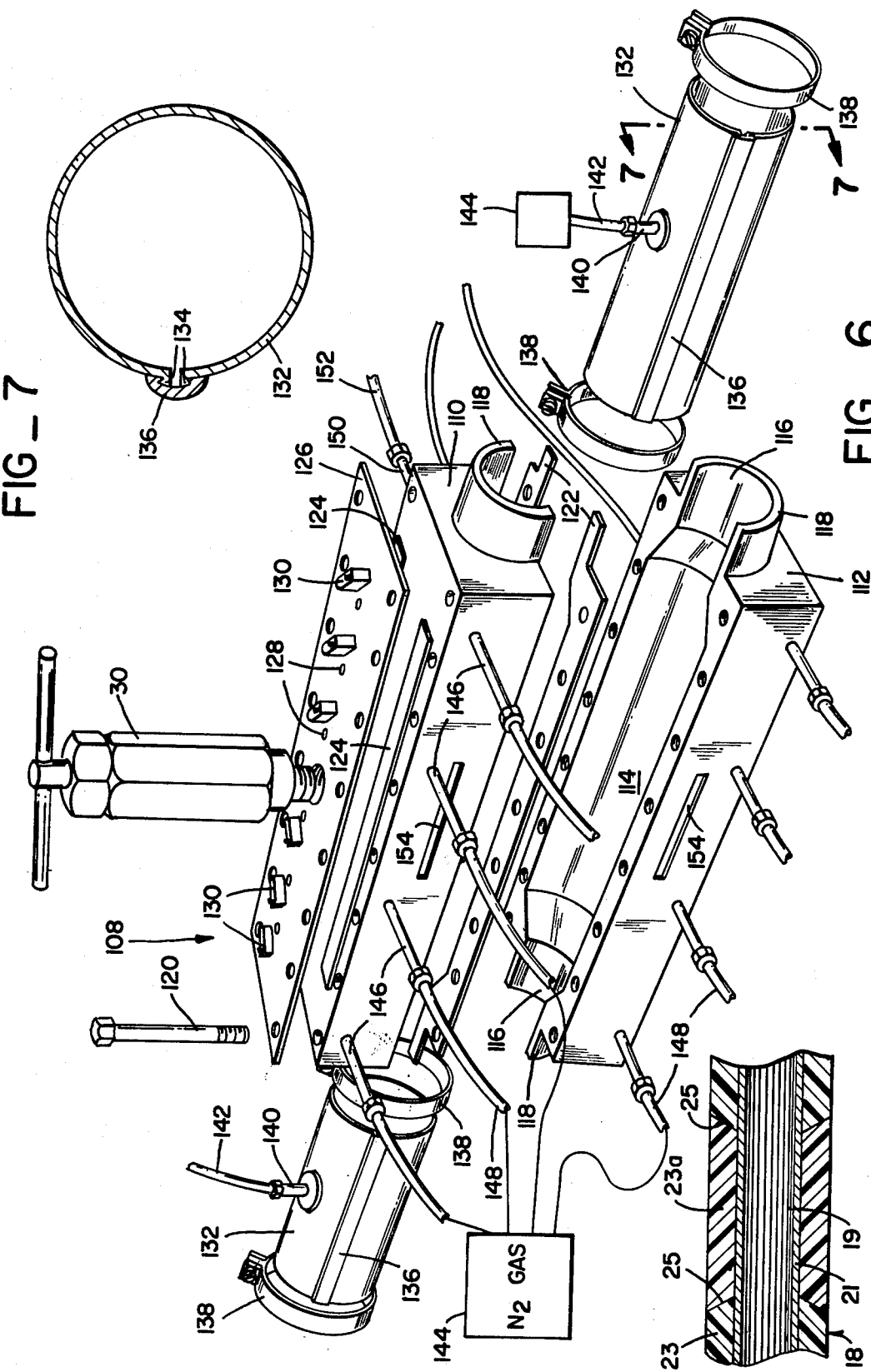

CABLE MOLDING APPARATUS FOR ACCOMPLISHING SAME

RELATED APPLICATIONS

This is a division of application Ser. No. 541,298, Filed Jan. 15, 1975, now U.S. Pat. No. 4,091,062, which in turn is a continuation-in-part (C-I-P) application of an application entitled CABLE MOLDING APPARATUS AND METHOD FOR ACCOMPLISHING SAME, Ser. No. 388,263; filed Aug. 14, 1973 now abandoned, which was a C-I-P application of an application entitled CABLE COVER AND MOLDING METHOD FOR USING SAME, Ser. No. 274,823 filed July 24, 1972 now abandoned and an application entitled MOLDING METHOD FOR SPLICING ELECTRICAL CABLE, Ser. No. 119,150 filed Feb. 26, 1971 now abandoned.

BACKGROUND OF THE INVENTION

1. Field of the Invention

The present invention relates to an apparatus for molding electrical insulation about a cable in a nitrogen atmosphere and in one particular embodiment to an apparatus for molding insulation on a portion of an electrical cable or the like where the molded portion is qualitatively as good as adjacent portions of the cable. The molding operation may occur in a repair of a cable or a splice.

2. Description of the Prior Art

As disclosed in the above-mentioned patent applications, high voltage electrical cable generally comprises a central electrically conductive core, covered by a semi-conductive layer which in turn is covered by a layer of insulation. About this insulation is another semi-conductive layer covered by a conductive layer all of which in turn is covered by an outer jacket of insulative material. Most high voltage cables use cross-linked polyethylene as the insulative material.

Problems have occurred when portions of the cable are damaged, or when it is desired to splice. For example, realizing that electrical cable is manufactured in long strands, it can be readily appreciated that during the manufacturing process damage occurring anywhere on the cable damages the entire cable. If a burn hole appears in a long length of cable, the entire cable is defective, since it will have little or no realiability. A manufacturer of such a damaged cable can cut the cable, extract the damaged part and then attempt to sell the shorter lengths of cable individually; or the manufacturer could completely scrap the cable, that is, salvage reclaimable portions and begin the manufacturing process anew; or the manufacturer may attempt to repair the cable.

Without the proper pressurization, repairing or splicing a cable with cross-linked polyethylene provided a reliably poor cable. That is, unless the polyethylene is subjected to a substantial superatmospheric pressure while it cures, air pockets or voids or other irregularities appear which can cause the development of a corona which in time would lead to a failure of the cable.

The cable manufacturing industry has long sought ways in which to reliably repair a newly manufactured cable. Of course, it is understood that to be commercially feasible, any repair apparatus or method invented must function at a reasonable cost level. The cable using industry faces a similar problem in attempting to reliably field splice a cross-linked polyethylene cable. Once again any discontinuities formed would mean a rapid cable failure. Commercialization would also require a reliable apparatus at a reasonably low cost.

SUMMARY OF THE INVENTION

The present invention fulfills the above-disclosed needs in the industry by enabling the efficient formation of cured polyethylene insulation about high voltage cables. According to the present invention, a high voltage cable which has a conductive core is surrounded with the insulating material, i.e., uncured polyethylene, which is then heated to soften or fluidize and cure it. While the material is heated, it is subjected to an inert gas, i.e., a nitrogen gas atmosphere of superatmospheric pressure. After the material has cured it is cooled to room temperature. During the cooling step the insulation material continues to be subjected to the pressurized nitrogen gas.

To prevent already cured, existing polyethylene insulation about the cable and contiguous to the insulation being formed from softening and flowing under the elevated temperature and pressure applied to the new insulation being cured, which would cause a deformation of the existing insulation and damage thereto, such existing insulation is either cooled to a sufficiently low temperature or it is subjected to sufficient external pressure surrounding the insulation to prevent its deformation. In the latter instance the affected cable portions are surrounded with a pressure tight flexible sleeve into which pressurized nitrogen gas is injected.

The present invention applies both to the formation of new cable and the formation of splices on existing cable. In the latter case, one embodiment of the invention includes the steps of preparing an item to be molded; placing the item to be molded into a mold cavity in the molding apparatus; packing recesses formed in the molding apparatus with soft resilient strips; heating the item; and pressurizing said mold cavity. In more detail, the method includes the step of cooling the region about the recesses and may include the step of introducing additional material into the mold cavity.

The present invention also provides apparatus for accomplishing methods set forth above. In general terms, such apparatus comprises means defining an insulation forming cavity disposed concentrically about the conductive core of the cable and means for applying uncured polyethylene about the core in the cavity. Means is provided for applying to the exterior of the polyethylene in the cavity nitrogen gas of a superatmospheric pressure, at least about 50 psi. Heating means is provided which is capable of heating the polyethylene within the cavity to a sufficient temperature to effect the curing thereof while the polyethylene is within the pressurized nitrogen atmosphere.

For repairing polyethylene cable, that is for forming polyehtylene insulation about a short section of uninsulated core disposed between existing cured polyethylene insulation, the present invention provides apparatus which comprises first and second mold halves defining an elongated mold cavity and concentric openings which communicate the cavity with the exterior of the mold. The openings receive cable portions with existing polyethylene insulation whereby the uninsulated section is placed within the cavity. Means is provided for securing the mold halves to each other, for injecting polyethylene into the cavity and for heating the mold halves to cure the injected polyethylene. A pressurized nitrogen gas source is fluidly coupled with the cavity to maintain the insulating material in an inert gas atmosphere. Means is further provided for subjecting portions of the existing cable insulation which are at an elevated temperature to about the same pressure as the pressure in the cavity to prevent the flow of heated, softened insulation and to thereby prevent deformation of and possible damage to the cable.

The last mentioned means is defined by sleeves which loosely surround the heated cable portions and which have one end sealingly secured to the mold and another end sealingly secured to the existing cable insulation. The sleeve is long enough so that the temperature at the point at which the sleeve is attached to the mold is sufficiently low to prevent the insulating material from flowing under pressure. The interior of the sleeve is pressurized with nitrogen gas to prevent the underlying heated insulating material from flowing.

In another embodiment, the present invention provides apparatus for molding insulation about an electrical cable or the like which has upper and lower mold forms which form a mold cavity, and means connected to at least one of the mold forms for heating the item to be molded which is positioned within the mold cavity. A plurality of apertures are spaced along the mold forms for receiving a fluid coolant, and packing means is positioned within recesses formed at each longitudinal end of the mold forms for retaining a higher than atmospheric pressure in the mold cavity. A plurality of temperature indication means are connected to the mold forms and spaced therealong at predetermined locations for disclosing temperature at the locations and a pressure indication means is connected to the mold forms for disclosing the pressure within the mold cavity. In addition, means may be connected to the upper mold portion for introducing material to be molded into the mold cavity, the material introducing means including a perforated disc; and another temperature indication means connected to the material introduction means for disclosing the temperature of the material as the material passes the perforated disc. Additionally, a check valve may be mounted to the upper mold form within a passage way through which the material to be introduced passes, the check valve for allowing the passage of material from the material introducing means into the mold cavity and for blocking passage of material from the mold cavity. The packing for the molding apparatus comprises a plurality of soft resilient strips.

An important aspect of the present invention is to provide a molding apparatus which can mold an insulative material reliably without introducing air or other gas pockets or other discontinuities.

Another aim of the present invention is to provide a molding apparatus for the molding of cross-linked polyethylene about an electrical cable without introducing discontinuities in a reliable manner, the apparatus being simply constructed easy to use and low in cost.

Another object of the present invention is to provide an apparatus for molding a portion of a cable with cross-linked polyethylene reliably without changing the qualitative features of the cable.

Another object of the present invention is to provide an apparatus for molding a portion of an electrical cable of cross-linked polyethylene which will not detract from the cable's electrical characteristics or integrity, nor leave any marks on the molded insulated surface.

Other objects and advantages of the invention will appear from the following description taken in conjunction with the accompanying drawings.

BRIEF DESCRIPTION OF THE DRAWINGS

FIG. 1 is an elevational view, partly diagrammatic, of the molding apparatus of the present invention;

FIG. 2 is an enlarged elevational sectional view of a portion of the apparatus shown in FIG. 1 illustrating a packing of the apparatus;

FIG. 3 is an enlarged elevational sectional view of a portion of the apparatus shown in FIG. 1 illustrating in detail means for introducing molding material;

FIG. 4 is a plan sectional view of a perforated disc taken along line 4—4 of FIG. 3;

FIG. 5 is an enlarged elevational sectional view of a portion of the apparatus shown in FIG. 1 illustrating a pressure indicator;

FIG. 6 is an exploded perspective view of a presently preferred embodiment of the invention;

FIG. 7 is an end view in section, taken along lines 7—7 of FIG. 6, of the cable pressurizing sleeves employed by the present invention; and FIG. 8 is a cross-sectional view of a high voltage cable having a polyethylene insulation.

DESCRIPTION OF THE PREFERRED EMBODIMENT

While the present invention is susceptible of various modifications and alternative constructions, illustrative embodiments are shown in the drawing and, with illustrative methods, will herein be described in detail. It should be understood, however, that it is not the intention to limit the invention to a particular form or apparatus disclosed; but, on the contrary, the invention is to cover all modifications, equivalences and alternative constructions falling within the spirit and scope of the invention as expressed in the appended claims.

Referring first to FIG. 8, a high voltage electrical cable 18 generally comprises a core 19 which defines the electrical conductor of the cable and which is surrounded by a first or inner semi-conductor layer 21. Polyethylene insulation 23 surrounds the semi-conductor layer. The finished cable further includes on the exterior of the polyethylene insulation 23 a second semi-conductive layer (not shown in the drawing), an electrically conductive shield (not shown in the drawing) surrounding the second semi-conductor, and finally an electrically insulating layer or jacket (not shown in the drawing) which forms the exterior of the finished cable. Since the present invention relates to the formation of the insulation layer 23, the outer layers are not shown to simplify the drawings and the description.

When the cable 18 is manufactured, the core including the first semi-conductor 21 receives a continuous, annular insulation layer 23 which can be formed with a variety of known apparatus. The present invention, as set forth below, is applicable to the manufacture of such a cable. It also is applicable for splicing cable, that is for forming a polyethylene insulation layer 23a to replace a previously removed section of insulation. The section might have been removed because of defects therein or because the underlying cable core 19 had previously been spliced. For such applications the ends of the existing insulation 23 adjoining the spliced section 23a are "penciled" that is the ends are tapered to form conical surfaces 25 before the insulation splice is applied.

In the manufacture of new cable as well as in making a splice uncured polyethylene is first applied around cable core 19 (including first semi-conductive layer 21). The polyethylene is sufficiently heated to fluidize it, that is so that it can be flowed into intimate contact with the core. The temperature is then maintained at a sufficient level to effect the curing of the polyethylene normally in the vicinity of 375° F.

It is well-known that polyethylene has a tendency to form voids during the curing step unless a substantial external pressure is applied. Furthermore, heated polyethylene has a tendency to oxidize unless it is maintained in an inert atmosphere. To avoid both an inert gas of superatmospheric pressure, i.e., nitrogen gas of at least 50 psi pressure, and preferably in a pressure range of between 50 to 250 psi, is applied while the polyethylene cures and thereafter until it has cooled to room temperature.

Referring now to FIGS. 6 through 8, the principles of the present invention, as delineated in the preceding paragraphs, will be set forth in detail in conjunction with a preferred embodiment of the invention as applied to the formation of splices on high voltage cables 18 having a polyethylene insulation 23. A mold 108 is defined by opposing mold halves 110, 112 which, when secured to each other, define an elongated cavity 114 and concentric end sections 116 which communicate the cavity with the exterior of the mold. In the shown embodiment, the end sections are defined by short, semi-cylindrical tubular protrusions 118. A plurality of bolts 120 (only one is shown in FIG. 6) firmly secure the mold halves to each other and a flat gasket 122 seals them. Each mold half is fitted with heaters 124 which are preferably positioned in flat recesses of the mold against which respective cover plates 126 are secured to retain the heaters in place. The mold and the cover plate include a plurality of vertically oriented, spaced-apart bleed holes 128 which communicate the mold cavity 114 with the atmosphere and which can be selectively closed with bleed hole covers 130 pivotally secured to the cover plate. Also mounted to the top of upper mold half 110 and communicating with mold cavity 114 is a transfer port or injection device 30 the construction and operation of which is more fully described hereinafter. The transfer pot is employed for injecting insulation material, that is softened polyethylene, into the mold cavity.

Before an insulation splice 23a can be formed, the mold halves are separated and a length of cable having a section from which the insulation was previously stripped, a core 19 and a first semi-conductor layer 21 is placed into the mold halves so that the stripped cable section is centered in mold cavity 114. The portions of the cable adjoining the stripped sections, which have an intact polyethylene insulation 23, rest within the cylindrical end sections 116 of the mold. Next, the mold is closed and bolts 120 are tightened.

A pair of gas-tight end sleeves 132 are provided and placed about the portions of cable 18 projecting past mold protrusions 118. The sleeves are preferably constructed of a flexible gas-tight material and they are longitudinally slitted so that they can be placed over the projecting cable portions. Each sleeve includes a pair of parallel, longitudinally extending protrusions 134 which are sealingly engaged by a generally C-shaped clamp 136. The end of each sleeve proximate mold 108 is pulled over the tubular protrusion 118 of the mold end secured thereto by a circular clamp 138 which is tightened to form an airtight seal between the sleeve and the mold protrusion. The other end of each sleeve is similarly tightened with a second circular clamp 138 against the exterior of the protruding cable. An airtight seal is thus formed so that the interior of the sleeve can be pressurized. A resilient material, such as closed cell foam or the like, may be placed in the longitudinal slit between sleeve protrusions 134 underlying circular clamps 138 to assure an airtight seal at the ends of the sleeve.

As is more fully described hereinafter, the interiors of the mold and the sleeves are subjected to pressurized nitrogen gas while the mold is heated and the polyethylene splice cures. For that purpose, conduits 140 are suitably secured to sleeves 132 for connection to flexible hoses 142 which in turn communicate with a source of pressurized nitrogen gas 144. Similarly, conduits 146 protrude from mold 108 and communicate through proper fluid passages (not separately shown in the drawing) with mold cavity 114. The mold conduits are also connected to the nitrogen gas source 144 via flexible hoses 148.

In use, a cable 18 is placed into the opened mold, the stripped cable section is centered in mold cavity 114, and the mold is closed. Sleeves 132 are placed over the cable portions projecting from the mold and the ends of the sleeves are sealingly secured to mold protrusion 118 and the cable as described above. Uncured polyethylene is now placed in transfer pot 30 (as more fully described hereinafter) and heaters 124 are energized until the polyethylene in the transfer pot has been softened. Thereafter, the polyethylene is transferred from pot 30 into mold cavity 114 in the manner described below. Bleed holes 128 are opened to permit an escape of gas from the cavity until polyethylene material appears through the holes whereupon they are closed with covers 130.

After the mold cavity has been filled with uncured polyethylene and all entrapped air has been vented pressurized nitrogen gas from source 144 is injected into the mold cavity via hoses 142 and connectors 140. As mentioned above, the nitrogen gas pressure ranges between 50 and 250 psi although higher pressures up to 500 psi may be employed if desirable. The controls for the heaters is now adjusted so that they heat the polyethylene in cavity to about 375° F., the curing temperature for polyethylene.

The equalization of the exerior pressure acting on the splice being cured within mold 108 and on the cable portions projecting from the mold and enveloped by sleeves 132 prevents the mold temperature and pressure from causing a slow flow of heated polyethylene from the existing cable insulation 23 in an outward direction. A deformation of the cable insulation, which can be fatal under high voltage service is thus prevented.

Pressure is maintained until the polyethylene is fully cured, normally for about two to three hours depending on the thickness of the insulation layer which in turn is determined by the service voltage for the cable. Upon completion of the curing step, heaters 124 are turned off and the mold is permitted to cool to room temperature. The nitrogen pressure within mold cavity 114 and sleeves 132 is maintained until the cable has been cooled to room temperature to prevent a subsequent formation of voids within the existing or the newly formed cable insulation, an oxidation of the insulation and/or a flow of softened cable insulation out of the mold and a resulting deformation thereof. After the cable splice has been fully cooled, the mold is opened and the cable removed therefrom.

To speed up the cooling step, cooling conduits (not separately shown in FIGS. 6 through 8) may be incorporated within mold halves 110, 112. Such passages are then connected to a source of a cooling fluid, normally cold water, which flows through the passages via a connector 150 and hoses 152. Mold 108 is further preferably provided with thermometers 154 to indicate the temperature of the mold and the splice being formed within mold cavity 114 and pressure indicating devices (not shown in FIGS. 6 through 8) to indicate the pressure within the cavity. One such pressure indicating device is more fully described hereinafter.

The pressurization of the mold cavity 114 with nitrogen gas during the curing step is normally necessary to prevent the above-discussed formation of voids and/or the oxidation of the polyethylene. This is particularly so, since existing cable insulation 23 is normally disposed within the cavity and end sections 116 of the mold. Existing insulation normally fails to snugly fit within the cavity of the mold or the end resulting in air spaces which must be filled with nitrogen gas for the above-stated reasons. In particular applications, however, it might be possible to assure a complete filling of the cavity with insulating material so that no air spaces remain. In such instances, the application of pressurized nitrogen gas during the curing step may be disposed with provided there is a sufficient internal pressure buildup within the cavity during the curing step. After curing, however, when the mold and the splice are cooled to room temperature, a pressurized nitrogen gas must be injected since the insulation material shirnks and separates from the mold walls. If gas is not injected, there will be a rapid pressure drop, air may enter and fill the resulting voids and even if such entry of air is prevented by properly sealing the mold, the pressure drop allows the formation of voids within the insulation material which seriously compromises the quality of the splice and in many cases may lead to a premature failure of the splice during high voltage service of the cable.

Referring now to FIG. 1, there is illustrated another embodiment of the invention which provides a molding apparatus 10 which includes an elongated upper mold form 12, and an elongated lower mold form 14 for defining a mold cavity 16. Positioned within the mold cavity is an item to be molded such as a portion of a high voltage electrical cable 18. The mold forms include longitudinal end portions 20, 22 which are packed to prevent injury to the outer jacket of the cable when molding. It is to be understood that while the molded item illustrated is an electrical cable, any other items susceptible of being molded may be used with the molding apparatus.

The molding apparatus 10 further includes a plurality of apertures 24 which are in communication with a coolant source 26 by way of conduits diagrammatically indicated by a series of lines designated by the numeral 28.

Attached to the upper mold form 12 is the injection means or transfer pot 30 for introducing the insulating material for forming cable splice 23a. The injection means or device will be described in more detail hereinbelow. Also shown attached to the upper mold form is a plurality of temperature indication means such as temperature gauges 32, 34, 36 which are important in the operation of the apparatus to insure a proper mold. Gauges 32 and 36 are adjacent the longitudinal ends of the apparatus while the gauge 34 is about midway between the ends. An additional temperature gauge 38 is attached to the injection device 30. To further monitor the molding operation, a pressure gauge 40 is attached to the lower mold form for communication with the mold cavity 16 to give an indication of pressure during the molding process.

To more fully appreciate the molding apparatus, a method for molding a high voltage electrical cable having cross-linked polyethylene as its insulative material will be described. As mentioned the purpose of the apparatus and of the method is to provide a way in which an item can be molded (either to repair or to splice) without creating discontinuities which will rapidly cause a cable failure. That is, the cable's reliability will not deteriorate because of the molding operation.

Before molding the portion to be molded is prepared for the method by removing the material covering the electrically conductive core or wires. As more fully described in the above-mentioned patent applications, this cable portion ought to be "penciled" in order to prevent a loss of electrical integrity. Next, a semi-conductive layer is wrapped or preferably molded about the core. It is desirable to have the outer surface of this layer in a smooth condition. This is followed by a covering of insulated material. This is later in turn covered by a second semi-conductive layer. Next an electrically conductive shield is provided about the cable. Finally, an electrically insulative layer or jacket is provided. The cable, after being covered by the first mentioned semi-conductive layer, is placed into the mold cavity 16. The upper mold form 12 and the lower mold form 14 are brought together in a closed relationship and retained in this relationship by a series of bolts designated by the numeral 42.

It is an important aspect of the present invention to accomplish the molding of the portion of the cable without detracting from the cable's reliability and while insuring that the remaining coverings can be applied to the molded portion without the introduction of trapped gas. It is, of course, understood that the region to be repaired only occupies a portion of the longitudinal length of the mold cavity. The end portions 20, 22 of the mold apparatus will be adjacent portions of the cable already having an insulative covering. Each of the end portions 20, 22 has recesses such as the recess 50 in the mold form 12 and a corresponding recess 52 in the mold form 14. The recesses 50, 52 are aligned so as to receive strips 54 of a soft resilient material such as rubber or neoprene. The material used preferably is no harder than a Shore sceleroscope reading of A 40. Attached to the longitudinal end portions 20, 22 are packing glands 55, 56 respectively which are attached by threaded bolts such as bolts 58 and 60. The packing glands retain the strips in the recesses when the strips are subjected to high pressure. It has been found that even under high pressure the strips will not leave any marks or indentations on the insulative surface of the cable as long as the temperatures at these regions are controlled. By leaving the surface of the cable smooth, air pockets will not be formed when additional coverings are placed upon the cable. Not only will an indentation be a source of air pockets but such a reduced thickness of insulation will cause a corresponding degradation of the voltage capability of the cable.

The injection device 30 is attached to the upper mold form and filled with unvulcanized cross-linked polyethylene pellets or slugs. By way of example, the slugs may be premolded into cylindrical biscuit shapes, 1⅝ inches in diameter and ¾ inch in height. Referring to FIG. 3, the injection device 30 is comprised of a housing 60 with a threaded end 62 which is received by a corresponding threaded opening 64 in the upper mold form 12. The opposite end 66 of the housing 60 is threaded for engagement with a cap 68. Reciprocally movable within the interior 70 of the housing is piston 72. When pellets 74 are used, they are positioned between the piston 72 and a perforated disc 76. Referring to FIG. 4, the perforated disc is positioned near the end 62 of the housing and is comprised of numerous holes 78 through which the polyethylene can flow once the pellets are sufficiently heated. When slugs are used, the disc is not needed. Slugs have an advantage over pellets in that the injection device need not be refilled as frequently since the slugs are more dense than the looser pellets.

A passageway 80 in the upper mold form is provided through which the polyethylene flows, as is depicted by the arrow 82, into the mold cavity 16. A check valve 84 is positioned by a pin 85 within the passageway 80 to allow passage of material in a downward direction as illustrated by FIG. 3 but not in an upward direction. Thus, any cross-linked polyethylene which enters the mold cavity 16 will not be able to flow back through the passageway. A pressure differential which would cause such a flow would immediately operate to apply a closing force to the check valve, as indicated by the arrow 86.

The temperature gauge 38 is located adjacent the disc 76 to disclose the temperature of the cross-linked polyethylene as the material passes the disc. In order to cause a flow of the polyethylene, a heat source 81, FIG. 1, heats the mold forms which transmits the heat to the injection means 30 and the disc 76 if used. When the material reaches approximately 250° F. it sufficiently softens or fluidizes that and a flow begins. If the disc and pellets are used, the holes 78, of the disc, provide a large heated surface area to the pellets thereby hastening the flow process. Without the disc, unmelted pellets passing into the mold cavity might introduce air. As mentioned, when using slugs, the disc may be eliminated without ill effect. Meanwhile, a coolant, such as water, is pumped into the region adjacent the end portions 20, 22 of the molding apparatus in order to maintain the temperature at these regions below about 135° F. The temperature gauges 32, 36 serve the function of disclosing the temperature at these locations. It is understood that a temperature gradient will exist along the length of the mold forms. Of coures, the mid-portion of the apparatus must be hottest to cure the unvulcanized new material while the ends must be relatively cool to prevent marking of the insulation. Depending upon the material of the insulation and of the mold forms, specific temperatures can be determined for the mid and end portions and a minimum length for the mold forms can also be determined so that a cooling at the ends does not prevent a sufficient heating at the mid-portion.

As the polyethylene in the injection device is heated sufficiently to flow the piston 72 is lowered to squeeze the polyethylene into the mold cavity 16. Pressure in the mold cavity will be at or slightly higher than ambient during movement of material from the injection device into the mold cavity. When the cavity is completely filled pressure is raised to at least about 50 psi and may go as high as 500 psi (with a preferred pressure range of between 50-250 psi) to insure that the cavity is completely filled and polyethylene has been forced into the interstices between the original cable insulation and the wall of the mold cavity. When the temperature of the mold has been increased to that for curing, about 375° F. for cross-linked polyethylene, the material expands increasing pressure further. When the mold cavity is filled with polyethylene, the injection device 30 is removed in order to prevent the excess polyethylene from curing within the injection device. The check valve 84 prevents an escape of material from the mold cavity and helps retain the high pressure within the mold cavity. As above-described pressurized nitrogen gas from a source 99 is now normally injected into the mold cavity to assure the formation of a high quality insulation splice.

The pressure within the molding cavity may be monitored by the gauge 40. As shown in FIG. 5, this pressure gauge is very simple constructed by providing an elongad slidable element 90 having an upper end 92 being exposed to the pressure within the mold cavity 16 and a lower end 94 which includes exposable indicia 96 to enable a direct reading of the pressure in the mold cavity. The element is slidable relative to a housing 98 one end of which is threadedly engaged to a cap 100 while the other end is threadedly engaged with the lower mold form 14. Connected to the element 90 is an annular flange 102 for bearing against a coil spring 104. The spring which is located between the flange 102 and the cap 100 biases the element 90 upwardly as shown in the drawing of FIG. 5 to what may be considered a zero pressure reading. An internal pressure depicted by the arrow 106 bearing upon the end 92 causes the element to slide relative to the housing 98 and against the spring force. By appropriately spacing the indicia, taking into consideration the spring force from the spring 104, a direct pressure indication may be achieved from the gauge.

As described above, during cooling the dry nitrogen source 99 remains connected near the ends 20, 22 of the apparatus to maintain a pressure in the mold cavity of at least about 50 psi and preferably of between 50 to 250 psi.

Prior to the pressurization of the mold cavity the packing glands 55, 56, FIG. 1, are tightened to the ends 20, 22, respectively, to assure a retention of the pressure. For a two inch diameter electrical cable the cross-linked polyethylene is cured for about two hours at approximately 375° F. as measured at about the center of the mold apparatus by the temperature gauge 34. At the end of the curing time, during which the polyethylene has gone from an unvulcanized state to a cured, cross-linked state, the heat source 81 is shut off while all of the cooling apertures 24 are provided with a cooling fluid, including those apertures toward the center portion of the molding apparatus (as opposed to just cooling the ends of the apparatus as initially required). During this time the nitrogen gas pressure is maintained. Cooling is continued until all of the temperature gauges 32, 34, 36 indicate room temperature, i.e., about 68° F. The nitrogen source 99 is then shut off as is the coolant source 26. The mold apparatus may then be opened and the cable removed and trimmed. Maintaining a pressure while the cable is being cooled avoids air pockets and the like from forming and causing potential corona discharge locations. Material such as ethylene propylene rubber (EPR) does not seem to behave upon cooling as cross-linked polyethylene and therefore does not require pressurization.

The cable may now be covered with an outer semi-conductive layer, a conductive shield of copper, for example, and then an insulative jacket. The insulative jacket may also be molded as described above without damaging markings.

What has thus been described is an apparatus and a method for molding a moldable item, in particular, an electrical cable such that the cable integrity is unharmed and, from a cosmetic standpoint, the newly molded portion of the cable is indistinguishable in outward appearance from the remainder of the cable. In addition, this feat is accomplished with an apparatus that is relatively simple in construction, reliable in operation and reasonable in cost.

I claim:

1. Apparatus for molding insulation about a high voltage cable section including a conductive core comprising: a first and second cooperating mold halves defining therebetween a cavity and generally cylindrical mold ends communicating the cavity with the exterior; means for heating the mold halves to a sufficient temperature to fluidize insulating material placed within the cavity; means for introducing into the cavity a pressurized gas; and means for subjecting cable portions extending beyond and being contiguous with the mold ends to a superatmospheric pressurized fluid medium to inhibit the flow of insulating material in a direction outwardly of the mold ends.

2. Apparatus according to claim 1 wherein the means extending beyond the mold ends is defined by sleeves which loosely surround the cable portions, and means for forming an airtight seal between the mold and first ends of the sleeves, and means for forming an airtight seal between the cable portions and second ends of the sleeves.

3. Apparatus according to claim 2 wherein the sleeves are defined by a gas-tight, flexible material.

4. Apparatus according to claim 3 wherein the means for forming airtight seals between the seals, the mold and the cable portions comprises clamps placed about the respective sleeve ends, and means for tightening the clamps against the sleeve ends and the mold and the cable portions, respectively.

5. Apparatus according to claim 1 including a source of pressurized nitrogen gas and means for fluidly connecting the source with the introducing means.

6. Apparatus according to claim 1 including means for selectively cooling portions of the mold halves.

7. Apparatus according to claim 6 wherein the cooling means comprise fluid passages within the mold means, and means for connecting the passages with a source of a cooling fluid.

8. A mold for forming splices about short, uninsulated sections of a high voltage cable having a conductive core, the apparatus comprising first and second mold halves defining therebetween an elongated mold cavity and opposed openings concentric with the cavity communicating the latter with the exterior of the mold; means for heating the mold halves to a temperature sufficient for plasticizing insulating material for the cable placed within the cavity; means for securing the mold halves to each other while the cable section is disposed within the cavity and with parts of the cable being exterior of the mold at said opposed openings; means for injecting insulating material into the cavity; means for pressurizing the cavity to at least about 50 psi; and means for subjecting said exterior parts of the cable at said openings to about the same pressure as the pressure in the cavity to prevent a flow of heated, softened cable insulation away from said section and to thereby prevent a resulting deformation of the cable insulation.

9. Apparatus according to claim 8 wherein the means for pressurizing the cable parts comprise sleeves that surround said parts.

10. In apparatus forming insulation about an electrical cable having mold means defining a mold cavity, and means for heating an item to be molded which is positioned within said mold cavity, the improvement comprising:
a plurality of apertures spaced along said mold forms for receiving a fluid coolant;
means positioned at each longitudinal end of the mold means for retaining a higher than atmospheric pressure in the mold cavity;
a plurality of temperature indication means connected to said mold forms and spaced therealong at predetermined locations for disclosing temperation at said location; and
a pressure indication means connected to said mold forms for disclosing the pressure within the mold cavity.

11. An apparatus as claimed in claim 10 wherein said plurality of temperature indication means comprise three temperature gauges, one positioned at each longitudinal end of said apparatus and a third gauge positioned about midway between said longitudinal ends.

12. An apparatus as claimed in claim 10 including:
means connected to the mold means for introducing material to be molded into the mold cavity; and
another temperature indication means connected to the material introduction means for disclosing the temperature of said material as said material passes through said material introduction means.

13. An apparatus as claimed in claim 12 wherein said plurality of temperature indication means comprises three temperature gauges, one positioned at each longitudinal end of said apparatus and a third gauge positioned about midway between said longitudinal ends.

14. An apparatus as claimed in claim 12 including a check valve mounted to the mold means and within a passageway through whigh the material to be introduced passes, the check valve allowing passage of material from the material introducing means into the mold cavity and for blocking passage of material from the mold cavity.

15. An apparatus as claimed in claim 14 wherein the pressure indication means comprises an elongaged slidable element having a first end in communication with the mold cavity and an exposable second end including indicia for corresponding to the pressure within the mold cavity, and a spring for biasing the element toward the mold cavity.

16. An apparatus as claimed in claim 15 wherein the means for retaining the pressure includes a plurality of soft resilient strips and a packing gland bolted to each longitudinal end of said apparatus for restraining said strips when said mold cavity is pressurized.

17. Apparatus for molding insulation about a high voltage cable having a conductive core, said apparatus comprising cooperating separable mold parts defining a mold cavity for receiving a section of the cable core and with an insulated portion of the cable projecting from an end of the mold cavity, means for heating said mold to a sufficient temperature to mold insulation material placed within the cavity about the core, means for applying superatmospheric pressure to the insulation during said heating, and means for applying such superatmospheric pressure to the projected insulated portion during said heating as to inhibit the flow of insulating material in a direction from the mold cavity toward said projected insulated portion.

18. Apparatus according to claim 17 in which said last-named means comprises a sleeve surrounding said projected insulated portion, said sleeve having an interior exposed to the pressure of the mold cavity and also having means forming a fluid tight seal with said projected insulated portion.

* * * * *

UNITED STATES PATENT AND TRADEMARK OFFICE
CERTIFICATE OF CORRECTION

PATENT NO. : 4,145,176
DATED : March 20, 1979
INVENTOR(S) : Arthur L. Nelson

It is certified that error appears in the above-identified patent and that said Letters Patent are hereby corrected as shown below:

Change the title of the invention to:
   --CABLE MOLDING APPARATUS--;

Col. 2, line 58, change "polyehtylene" to
   --polyethylene;

Col. 4, line 36, change "invention" to --intention--;

Col. 7, line 33, change "shirnks" to --shrinks--;

Col. 10, line 17, change "simple" to --simply--;

Col. 12, line 43, change "whigh" to --which--;

Col. 12, line 49, change "elongaged" to --elongated--.

Signed and Sealed this

Twenty-fourth Day of July 1979

[SEAL]

Attest:

Attesting Officer

LUTRELLE F. PARKER
Acting Commissioner of Patents and Trademarks